US009580668B2

(12) United States Patent
Takeuchi et al.

(10) Patent No.: US 9,580,668 B2
(45) Date of Patent: Feb. 28, 2017

(54) PROCESS FOR PRODUCING PURIFIED ESSENTIAL OIL

(75) Inventors: Ryo Takeuchi, Kanagawa (JP); Shigemasa Oshikubo, Kanagawa (JP)

(73) Assignee: TAKASAGO INTERNATIONAL CORPORATION, Tokyo (JP)

(*) Notice: Subject to any disclaimer, the term of this patent is extended or adjusted under 35 U.S.C. 154(b) by 225 days.

(21) Appl. No.: 13/466,370

(22) Filed: May 8, 2012

(65) Prior Publication Data

US 2012/0219672 A1    Aug. 30, 2012

Related U.S. Application Data

(62) Division of application No. 13/127,763, filed as application No. PCT/JP2009/069221 on Nov. 11, 2009, now abandoned.

(30) Foreign Application Priority Data

Nov. 11, 2008   (JP) ................................ 2008-288699

(51) Int. Cl.

| | |
|---|---|
| *A61K 36/752* | (2006.01) |
| *A61K 36/00* | (2006.01) |
| *A23C 9/14* | (2006.01) |
| *C12H 1/04* | (2006.01) |
| *C12H 1/14* | (2006.01) |
| *C11B 3/00* | (2006.01) |
| *C11B 7/00* | (2006.01) |
| *C11B 13/00* | (2006.01) |
| *C11B 9/02* | (2006.01) |
| *A23L 2/56* | (2006.01) |
| *B01D 15/00* | (2006.01) |
| *B01J 20/20* | (2006.01) |

(52) U.S. Cl.
CPC ................ *C11B 9/022* (2013.01); *A23L 2/56* (2013.01); *A23L 27/12* (2016.08); *A23L 27/13* (2016.08); *B01D 15/00* (2013.01); *B01J 20/20* (2013.01); *A23V 2002/00* (2013.01)

(58) Field of Classification Search
None
See application file for complete search history.

(56) References Cited

FOREIGN PATENT DOCUMENTS

| JP | 02001810 B | * | 5/1927 |
|---|---|---|---|
| JP | 73946 C2 | | 10/1927 |
| JP | 55-018435 A | | 2/1980 |
| JP | 57-57109 B2 | | 12/1982 |
| JP | 58-194974 A | | 11/1983 |
| JP | 59-142297 A | | 8/1984 |
| JP | 63-089594 A | | 4/1988 |
| JP | 63-118399 A | | 5/1988 |
| JP | 1-247495 A | | 10/1989 |
| JP | 2-16794 B2 | | 4/1990 |
| JP | 5-345899 A | | 12/1993 |
| JP | 6-145960 A | | 5/1994 |
| JP | 9-187647 A | | 7/1997 |
| JP | 2000-072790 A | | 3/2000 |
| JP | 2001-121179 A | | 5/2001 |
| JP | 2002-332491 A | | 11/2002 |
| JP | 2003-508554 A | | 3/2003 |
| JP | 2003-261314 A | | 9/2003 |
| JP | 2004-223346 A | | 8/2004 |
| JP | 2004-267815 A | | 9/2004 |
| JP | 2005-143370 A | | 6/2005 |
| JP | 4133755 B2 | | 6/2008 |
| WO | 99/53002 A1 | | 10/1999 |
| WO | 2007-001697 A1 | | 1/2007 |
| WO | 2007/077913 A1 | | 7/2007 |
| WO | 2007-117902 A1 | | 10/2007 |
| WO | 2008/054228 A1 | | 5/2008 |

OTHER PUBLICATIONS

Burt (2004) Inter. J. Food Microbiol. 94: pp. 223-253.*
Adams et al. (1996) J. Environmental Engineering Apr. 1996 pp. 327-330.*
Jiang et al. (2006) Water Research 40: pp. 1657-1667.*
Hayashi et al. (1961) Kagaku to Kogyo 35, 459-464.*
Kiguchi et al. (2000) Bunseki Kagaku vol. 49, No. 8, pp. 575-582.*
Khalili et al. (2000) Carbon 38 pp. 1905-1915.*
Liou (2010) Chemical Engineering Journal 158 pp. 129-142.*
Sathishkumar et al. (2008) Adsorption Science and Technology, vol. 26, No. 9, pp. 679-686.*
Tsai et al. (1998) Bioresource Technology 64; 211-217.*
Matsui et al. (2003) Water research 37: 4413-4424.*
Maes et al. (2005) JAOCS 82, 593-597.*
Khalili et al. (2000) Carbon 38: 1905-1915.*
Hu et al. (2998) Wat. Res. vol. 32, No. 9, pp. 2593-2600.*
Agbekodo et al. (1996) Wat. Res. vol. 30, No. 11, pp. 2535-2542.*
Ahmadpour et al. (1996) Carbon vol. 34, No. 4, pp. 471-479.*
Martin-Gullon et al. (2001) Wat. Res. vol. 35, No. 2, pp. 516-520.*
International Searching Authority, International Search Report (PCT/ISA/210) issued on Feb. 16, 2010, in PCT/JP2009/069221.

(Continued)

*Primary Examiner* — Chris R Tate
*Assistant Examiner* — Russell Fiebig
(74) *Attorney, Agent, or Firm* — Sughrue Mion, PLLC

(57) ABSTRACT

It is provided a process for producing a purified essential oil excellent in safety and quality with high productivity from an essential oil comprising a harmful contaminant such as an agricultural chemical by simply and smoothly removing the contaminant with high removal rate without causing poor balance of flavor which the essential oil originally has, decrease of flavor strength and the like. It relates to a process for producing a purified essential oil by treating an essential oil comprising a contaminant with an active carbon to remove the contaminant and the removal rate of the contaminant is further improved by using an active carbon activated with a chemical, particularly an active carbon activated with zinc chloride, in the treatment, or by conducting the treatment at a low temperature of room temperature or lower, particularly at −25° C. to 5° C.

2 Claims, No Drawings

(56) References Cited

OTHER PUBLICATIONS

International Searching Authority, Written Opinion (PCT/ISA/237) issued Feb. 16, 2010, in PCT/JP2009/069221.
Japanese Patent Office, Journals of Patent Office, Koho Shuchi; Kan'yo Gijutsu (Koryo) Dai I Bu Koryo Ippan, Jan. 29, 1999; pp. 1-19, 72 and 187 to 190.
Yoshitaka Sudo; "Kasseitan ni yoru Noyaku Suiyoeki no Kyuchaku Sokudo"; Kagaku Kogaku Ronbunshu; 1993, vol. 19 No. 5; pp. 803-808.
Z. Aksu, et al.; Adsorption Characteristics of 2, 4-Dichlorophenoxyacetic Acid (2, 4-D) from Aqueous Solution on Powdered Activated Carbon, Journal of Environmental Science and Health Part B; 2005; vol. 40 No. 4; pp. 545-570.
Japanese Patent Office, Communication dated Jan. 19, 2011 issued in a counterpart JP application No. 2008-288699.
Japan Patent Office Bulletin, published on Jan. 29, 1999, Collection of well-known and conventional technologies (flavor or fragrance), first section, flavor or fragrance in general, pp. 4-21 and 72-75.
Japanese Patent Office, Office Action dated May 30, 2013, issued in a counterpart Japanese application No. 2008-288699.

\* cited by examiner

PROCESS FOR PRODUCING PURIFIED ESSENTIAL OIL

CROSS REFERENCE TO RELATED APPLICATIONS

This is a divisional application of U.S. application Ser. No. 13/127,763 filed May 5, 2011, which is a 371 of PCT/JP2009/069221 filed Nov. 11, 2009, which claims priority of Japanese Application No. 2008-288699 filed Nov. 11, 2008; the above noted applications are incorporated herein by reference in their entirety.

TECHNICAL FIELD

The present invention relates to a process for producing a purified essential oil, a purified essential oil obtained by the process, a flavor composition comprising the purified essential oil, and food, drink, or oral care products, each comprising the purified essential oil and/or the flavor composition.

In more detail, the present invention relates to a process for producing a purified essential oil having excellent safety and high quality by efficiently removing a harmful contaminant such as residual agricultural chemicals contained in an essential oil without causing poor balance of flavor which the essential oil originally has, and decrease in flavor strength, a purified essential oil obtained by the process, a flavor composition comprising the purified essential oil, and food, drink, or oral care products, each comprising the purified essential oil and/or the flavor composition.

BACKGROUND ART

Essential oil (essential oil or natural essential oil) is an organic substance comprising a volatile odorant substance, extracted form a plant. The essential oil is obtained by treating a plant as a raw material with steam distillation, compression, extraction and the like, and recovering an oil comprising volatile odorant ingredients.

Of essential oils, citrus oil using citrus as a raw material is that monoterpene hydrocarbon which is a scent ingredient contained in citrus, and other terpene hydrocarbons are unstable to heat and light. For this reason, a so-called "cold press method" which recovers an oil by compressing citrus (particularly, coat of citrus) without applying heat is generally widely employed as a preparation method of the citrus oil.

The essential oil obtained above is generally used without modification as flavor or fragrance in various uses including cosmetic or food. However, in the case where troubles such as coloration, precipitation, turbidity, deteriorated odor and the like occurred by chemical change and alternation of ingredients contained in the essential oil during storage, the essential oil is purified and used. As the purification method in such a case, a method by distillation, a method of treating with a porous adsorbent, a cleaning treatment method, a filtration treatment method, and the like are employed. In the case of treating with a porous adsorbent, inorganic adsorbents such as active carbon, silica gel, alumina and zeolite, organic adsorbents such as styrene-divinylbenzene copolymer adsorbent and acryl absorbent, ion-exchange resins, porous glasses, and the like are used (see Non-Patent Document 1).

The essential oil is derived from natural plant, and should be inherently safe. However, a harmful contaminant such as agricultural chemicals, different from altered substances formed by chemical change and the like of the ingredients during storage and impurities originally contained in the essential oil, are sometimes detected, and the countermeasure becomes the problem.

The cause that agricultural chemicals are detected from the essential oil includes the case where agricultural chemicals used in the course of growth of a plant or used in the course of storage and distribution of the plant harvested are attached to and adsorbed on the plant as a raw material, and the agricultural chemicals move into the essential oil and remain therein, and the case where a plant absorbs agricultural chemicals not decomposed and accumulated in the soil among agricultural chemicals used in the past, from root, and the agricultural chemicals move into the essential oil and remain therein.

A method of conducting supercritical extraction of dried plant raw material, a method of conducting extraction treatment of a plant using a hydrophobic extractant, and the like are known as a method for producing a plant extract in which agricultural chemicals do not remain. However, those methods are a method that residual agricultural chemicals are avoided from being contained in a plant extract when preparing a plant extract by an extraction treatment of a plant. Therefore, the method cannot be applied to an essential oil, particularly citrus oil, in which scent ingredients are recovered by a compression method without using extraction.

A method wherein a plant extract, in which organic chlorine compound type agricultural chemicals remain therein, is dissolved in a mixed solution of a lower aliphatic alcohol and water in a volume ratio of from 10:90 to 80:20, and then the resulting solution is contacted with a porous adsorbing resin having a modal radius of pores of from 30 to 120 angstroms, the porous adsorbing resin comprising a three-dimensional copolymer of styrene and divinylbenzene and the like, thereby adsorbing residual agricultural chemicals in the solution on the adsorbing resin, and the plant extract is recovered from the treated solution is known as a method for removing agricultural chemicals remained in a plant extract (Patent Document 1). However, in the case of this method, effective ingredients having similar properties to those of residual agricultural chemicals, contained in the plant extract are adsorbed on the absorbing resin together with the residual agricultural chemicals. As a result, there is a problem that absorption loss is large, resulting in decrease in yield of a plant extract.

Furthermore, this method is a method for removing residual agricultural chemicals from a plant extract obtained by previously conducting an extraction treatment, such as a tea extract, and an essential oil obtained by compression without using extraction is not an intended material to be treated.

A method of cleaning an essential oil with an alkaline aqueous solution (Patent Document 2) and a method of treating an essential oil with a strong ion-exchange resin (Patent Document 3) are known as the method for removing residual agricultural chemicals from an essential oil.

However, the method of cleaning an essential oil with an alkaline aqueous solution has the problem that alkali-soluble flavor ingredients in the essential oil move into the alkaline aqueous solution, causing poor balance of flavor of the essential oil and considerable decrease in flavor strength, and the quality of the essential oil is greatly decreased.

The method of treating an essential oil with a strong ion-exchange resin has various problems that (a) because the strong ion-exchange resin is hydrophilic while the essential oil is hydrophobic, it is difficult to increase contact efficiency of the essential oil to the strong ion-exchange resin, and removal efficiency of residual agricultural chemicals is low; (b) there is a concern that water incorporates into the essential oil; (c) there is a concern that aldehydes which are important flavor ingredients in the essential oil are ethanolated, thereby inducing a polymerization reaction; (d) in the case where the strong ion-exchange resin is a cationic ion-exchange resin, loss of acidic flavor compounds in the essential oil occurs, on the other hand, in the case where the strong ion-exchange resin is an anionic ion-exchange resin, loss of alkaline flavor compounds in the essential oil occurs, and poor balance of flavor of the essential oil and decrease in flavor strength are easy to occur; and (e) there is a concern that dissolution of the strong ion-exchange resin occurs by the essential oil.

As described above, Non-Patent Document 1 describes that in the case where coloration, precipitation, turbidity, deteriorated odor and the like occurred by chemical change and alternation of ingredients contained in the essential oil during storage, the essential oil is purified with an adsorbent such as active carbon, thereby improving flavor. However, Non-Patent Document 1 does not describe the preparation of an essential oil having excellent safety, free of contaminant such as agricultural chemicals by treating an essential oil contaminated with a contaminant such as agricultural chemicals with active carbon.

Under the above circumstances, development of a method capable of producing a purified essential oil having excellent safety and high quality with good productivity by smoothly removing a contaminant such as agricultural chemicals contained in the essential oil in a simple operation while maintaining good balance of flavor which an essential oil originally has and flavor strength without causing loss and deterioration of flavor ingredients contained in the essential oil is being demanded.

PRIOR ART REFERENCES

Patent Document

Patent Document 1: JP-A-2000-72790
Patent Document 2: WO 2007/117902
Patent Document 3: WO 2007/001697

Non-Patent Document

Non-Patent Document 1: Journals of Patent Office, "Published collection of well-known prior arts (Flavor or Fragrance)", Part 1, General of Flavor or Fragrance, Jan. 29, 1999, pages 4-5 and 72

SUMMARY OF THE INVENTION

Problems that the Invention is to Solve

An object of the present invention is to provide a process for producing a purified essential oil, that can obtain a purified essential oil having excellent safety and high quality with high productivity by smoothly removing a contaminant from an essential oil comprising the contaminant such agricultural chemicals in a simple operation while maintaining good balance of flavor which the essential oil originally has and flavor strength without causing loss and deterioration of flavor ingredients contained in the essential oil.

In addition, an object of the present invention is to provide a purified essential oil having excellent safety and quality, free of a contaminant such as agricultural chemicals and having good balance of flavor and high flavor strength.

In addition, an object of the present invention is to provide a flavor composition comprising the purified essential oil having excellent safety and quality, products such as a food, drink, or oral care products, each comprising the purified essential oil and/or the flavor composition.

Means for Solving the Problems

The present inventors have made various investigations to achieve the above objects. As a result, they have found that when an essential oil comprising a contaminant is treated with an active carbon, the contaminant contained in the essential oil can be efficiently removed in an extremely simple operation while preventing poor balance of flavor and decrease in flavor strength, and a purified essential oil having excellent safety and quality can be produced with high productivity.

The present inventors have further found that the method for removing a contaminants contained in an essential oil by the active carbon is very effective to the removal of residual agricultural chemicals from the essential oil.

The present inventors have further found that the method for removing a contaminant by treating the essential oil with an active carbon is also effective to any essential oil such as citrus oil, spice oil and herb oil, and above all, the method is more effective to the removal of a contaminant, particularly residual agricultural chemicals, contained in citrus oil.

The present inventors have further found that in removing a contaminant contained in an essential oil with an active carbon, a temperature range exceeding the coagulation temperature of the essential oil and in which volatilization of the essential oil is low can be employed, and above all, when active carbon treatment is conducted at low temperature of from −30° C. to 5° C., the removal rate of a contaminant such as agricultural chemicals, contained in the essential oil is further improved.

The present inventors have further found that as the active carbon used in the removal of a contaminant contained in the essential oil, an activated active carbon is preferably used from the point of high removal rate of a contaminant, and of such activated active carbon, active carbon activated with a chemical, particularly active carbon activated with zinc chloride, exhibits higher removal rate of a contaminant, particularly residual agricultural chemicals, and is therefore more preferably used. The present invention has been completed based on those various findings.

Specifically, the present invention is as follows.

(1) A process for producing a purified essential oil, wherein an essential oil comprising a contaminant is treated with an active carbon to remove the contaminant.

(2) The process for producing a purified essential oil according to (1), wherein the contaminant is a residual agricultural chemical.

(3) The process for producing a purified essential oil according to (2), wherein the agricultural chemical is one kind or two or more kinds selected from ortho-phenyl phenol, chloroneb, simazine, carbaryl, chlorpyrifos, imazalil, thiabendazole and diphenyl.

(4) The process for producing a purified essential oil according to any one of (1) to (3), wherein the essential oil is one kind or a mixture of two or more kinds selected from citrus oil, spice oil and herb oil (5) The process for producing a purified essential oil according to (4), wherein the citrus oil is one kind or a mixture of two or more kinds selected from lemon oil, sweet orange oil, bitter orange oil, lime oil, grapefruit oil, bergamot oil, mandarin oil, Yuzu oil (Citrus junos oil) and Sudachi oil (Citrus sudachi oil).

(6) The process for producing a purified essential oil according to (4), wherein the spice oil is one kind or a mixture of two or more kinds selected from allspice, anise oil, star anise oil, bitter almond oil, blackcurrant oil, cinnamon oil, clove oil, ginger oil, mustard oil and pepper oil.

(7) The process for producing a purified essential oil according to (4), wherein the herb oil is one kind or a mixture of two or more kinds selected from sweet basil oil, celery oil, clary sage oil, eucalyptus oil, peppermint oil, mint oil and spearmint oil.

(8) The process for producing a purified essential oil according to any one of (1) to (7), wherein the essential oil is treated with the active carbon at a temperature of from −30° C. to 5° C.

(9) The process for producing a purified essential oil according to any one of (1) to (8), wherein the active carbon is an activated active carbon.

(10) The process for producing a purified essential oil according to (9), wherein the activated active carbon is an active carbon activated with a chemical.

(11) The process for producing a purified essential oil according to (10), wherein the chemical is zinc chloride.

(12) A purified essential oil obtained by the production process according to any one of (1) to (11).

(13) A flavor composition comprising the purified essential oil according to (12).

(14) A food or drink comprising the purified essential oil according to (12) and/or the flavor composition according to (13).

(15) An oral care product comprising the purified essential oil according to (12) and/or the flavor composition according to (13).

Advantage of the Invention

According to the process of the present invention, a contaminant contained in an essential oil can be efficiently removed with active carbon in an extremely simple operation while preventing poor balance of flavor and decrease in flavor strength, and therefore, a purified essential oil having excellent safety and quality can be produced with high productivity.

In particular, the process of the present invention is extremely effective to the removal of agricultural chemicals from an essential oil comprising the agricultural chemicals as a contaminant. The purified essential oil obtained in the present invention does not contain a harmful contaminant such as agricultural chemicals, or if contained, contains the harmful contaminant in an extremely slight amount to an extent of not impairing humans and animals, and therefore it is excellent in safety.

The process of the present invention is effective to any essential oil such as citrus oil, spice oil and herb oil, and above all, the contaminant, particularly residual agricultural chemicals, contained in the citrus oil can be removed with high removal rate.

In the process of the present invention, when the treatment of an essential oil with an active carbon is conducted at low temperature, particularly from −30° C. to 5° C., the contaminant such as agricultural chemicals, contained in the essential oil can be removed with higher removal rate.

In the process of the present invention, when the activated active carbon, particularly active carbon activated with a chemical, above all, active carbon activated with zinc chloride, is used as the active carbon for removing a contaminant, the contaminant, particularly residual agricultural chemicals, can be extremely smoothly removed with further high removal rate.

MODE FOR CARRYING OUT THE INVENTION

The present invention is described in detail below.

The present invention relates to a process for producing a purified essential oil, comprising treating an essential oil comprising a contaminant with an active carbon, thereby removing the contaminant.

The term "contaminant" used in the present description means substances that do not correspond to substances constituting a plant itself which is a raw material of an essential oil and substances derived from the substances (for example, substances formed by chemical change and alternation of substances constituting a plant), and is a generic name of substances that are harmful to humans and animals or substances that have a concern to be harmful.

The kind of the contaminant contained in the essential oil is not particularly limited. Representative examples of the contaminant include agricultural chemicals, heavy metals, fungi, and toxins derived from fungus. Of those, the present invention is suitable for the removal of agricultural chemicals from the essential oil in which the agricultural chemicals remain therein.

The kind of agricultural chemicals contained in the essential oil is not particularly limited, and can be any agricultural chemicals so long as it is agricultural chemicals capable of being removed by the process of the present invention. Examples of the agricultural chemicals include ortho-phenyl phenol, chloroneb, simazine, carbaryl, chlorpyrifos, imazalil, thiabendazole, diphenyl, trichlorfon, fenitrothion, prothiofos and methidathion. The agricultural chemicals contained in the essential oil may be any one kind of those, or may be two or more kinds of those.

Of those, the process of the present invention is effective to the removal of agricultural chemicals such as ortho-phenyl phenol, chloroneb, simazine, carbaryl, chlorpyrifos, imazalil, thiabendazole and diphenyl, the residual agricultural chemicals thereof becoming the problem in the citrus oil, from the citrus oil comprising those agricultural chemicals, and is particularly suitable to the removal of ortho-phenyl phenol from the citrus oil comprising the ortho-phenyl phenol as residual agricultural chemicals.

The kind of the essential oil used in the process of the present invention is not particularly limited, and any essential oil can be used so long as it is an essential oil that can achieve the object of the present invention. Above all, one kind or a mixture of two or more kinds of citrus oil, spice oil and herb oil is preferably used.

More specifically, examples of the citrus oil include lemon oil, sweet orange oil, bitter orange oil, lime oil, grapefruit oil, bergamot oil, mandarin oil, Yuzu oil (Citrus junos oil) and Sudachi oil (Citrus sudachi oil).

Examples of the spice oil include allspice, anise oil, star anise oil, bitter almond oil, blackcurrant oil, cinnamon oil, clove oil, ginger oil, mustard oil and pepper oil.

Examples of the herb oil include sweet basil oil, celery oil, clary sage oil, eucalyptus oil, peppermint oil, mint oil and spearmint oil.

The essential oil used in the present invention may consist of any one kind of the above-described oils, and may be a mixture of two or more kinds of those.

The kind of a contaminant, particularly the kind of agricultural chemicals, contained in the essential oil, and the content of the contaminant vary depending on the kind of a plant which is a raw material of an essential oil, production area of a plant, cultivation method of plant, storage/distribution methods, a preparation method of an essential oil from a plant, and the like. For example, in the citrus oil obtained by a cold press method, ortho-phenol which is one kind of agricultural chemicals frequently remains in an amount of a range of from 0.01 to 70 ppm when measured with gas chromatograph/mass spectrometry-mass spectrometry (GC/MS-MS). The process of the present invention is extremely effective to the removal of ortho-phenyl phenol from citrus oil in which the ortho-phenyl phenol remains, obtained by the cold press method.

In the process of the present invention, for example, powdery active carbon, granular active carbon (crushed carbon, granulate carbon, pelletized carbon), spherical active carbon and fibrous active carbon can be used as the active carbon. Of those, the powdery active carbon and/or the granular active carbon are preferably used from the points that the removal effect of a contaminant from an essential oil is high, and handling property, adsorption efficiency and economical efficiency are excellent.

The origin of the active carbon used in the process of the present invention is not particularly limited. For example, active carbon produced using palm shell, woody material (sawdust, wood chip and the like), coal or petroleum can be used. Of those, the active carbon using palm shell or woody material as a raw material is preferably used from the viewpoints of safety and environmental pollution prevention when the purified essential oil is used in food uses.

The active carbon used in the process of the present invention may be activated active carbon or may be non-activated active carbon. Of those, the activated active carbon shows high removal rate of a contaminant from the essential oil, and is therefore preferably used. Active carbon activated with a gas such as steam and active carbon activated with a chemical (zinc chloride, phosphoric acid or the like) can be used as the activated active carbon. Of those, the active carbon activated with a chemical, particularly, the active carbon activated with zinc chloride, shows higher removal rate of contaminant, particularly residual agricultural chemicals, from the essential oil, and is therefore preferably used.

Although not limited, examples of the active carbon that can be used in the process of the present invention include "Kyouryoku Shirasagi", "Seisei Shirasagi" and "Tokusei Shirasagi" (each is zinc chloride-activated powdery active carbon), manufactured by Japan EnviroChemicals, Ltd.; "Shirasagi A", "Shirasagi M", "Shirasagi C" and "Shirasagi P" (each is steam-activated powdery active carbon), manufactured by the same company; "Shirasagi WH$_2$c" (steam-activated granular active carbon) manufactured by the same company; "Kuraray Coal GL" and "Kuraray Coal GW" (steam-activated active carbon: powdery and granular), manufactured by Kurary Chemical Co., Ltd.; "Taiko S", "Taiko SG" and "Taiko SGP" (each is zinc chloride-activated powder active carbon), manufactured by Futamura Chemical Co., Ltd.; and "Diahope S80S", manufactured by Calgon Mitsubishi Chemical Corporation.

In producing a purified essential oil by removing a contaminant such as agricultural chemicals, contained in the essential oil with the active carbon, the following methods can be employed: a method for recovering a purified essential oil by adding active carbon to an essential oil comprising a contaminant, followed by stirring for a given time, and then separating the active carbon (batch method); and a method for recovering a purified essential oil by passing an essential oil comprising a contaminant through a column filled with the active carbon, thereby adsorbing the contaminant on the column (column method).

In the case of producing the purified essential oil by the batch method, the active carbon is generally added in an amount of preferably 0.1% by mass or more, and more preferably from 0.5 to 20% by mass, based on the mass of the essential oil comprising a contaminant, although varying depending on the kind of the essential oil, the kind and the content of the contaminant in the essential oil, the kind of the active carbon, and the like. In the case where the content of the contaminant contained in the essential oil is the basis, it is preferred that the active carbon is added in an amount of from 20 to 3,000 parts by mass, particularly from about 50 to 1,500 parts by mass, per 1 part by mass of the contaminant.

In the case of producing the purified essential oil by the column method, flow down rate and the like of the essential oil in the active carbon-filled column are adjusted according to the kind of the essential oil, the kind and the content of the contaminant in the essential oil, the kind of the active carbon, the filling amount of the active carbon in the column, and the like, so that the contaminant in the essential oil is sufficiently removed.

In any of the batch method and the column method, the treatment time by the active carbon is preferably from 10 minutes to 5 hours.

In removing the contaminant contained in the essential oil with the active carbon, the following methods can be employed. ($\alpha$) A method of directly using the essential oil comprising the contaminant without diluting with a solvent and treating the same with the active carbon; ($\beta$) a method of mixing an edible solvent with the essential oil comprising the contaminant to dilute the essential oil, and treating the resulting dilute liquid with the active carbon; ($\gamma$) a method of adding a non-edible solvent to the essential oil comprising the contaminant to dilute the essential oil, and treating the resulting dilute liquid with the active carbon; and ($\delta$) a method of diluting the essential oil comprising the contaminant with an essential oil free of a contaminant, and treating the resulting dilute liquid with the active carbon.

In the case of employing the methods ($\alpha$) and ($\delta$), the purified essential oil obtained by the removal treatment of the contaminant with the active carbon can be directly used in the respective uses, or as may be necessary, the edible solvent as used in the method ($\beta$) is added to the essential oil, and the resulting dilute liquid can be used in the respective uses.

Examples of the edible solvent used in the method ($\beta$) include ethanol, water, glycerin, medium-chain triglyceride and vegetable fat or oil. One kind or two or more kinds of those can be used. The edible solvent used here may be used in the respective uses in the form of an edible solvent solution of the purified essential oil without separating from the purified essential oil after completion of the removal treatment of the contaminant with the active carbon, or may be distilled away from the purified essential oil by distillation under reduced pressure, or the like.

Examples of the non-edible solvent used in the method ($\gamma$) include organic solvents such as hexane, ethyl acetate, acetone, butanol, propanol and methanol. One kind or two or more kinds of those solvents can be used. The non-edible solvent used here is distilled away by distillation under reduced pressure or the like after completion of the removal treatment of the contaminant with active carbon.

In removing the contaminant by treating the essential oil comprising a contaminant with active carbon, the removal treatment is conducted in a range of a temperature that the temperature (liquid temperature) of an essential oil liquid comprising a contaminant or a diluted essential oil solution is higher than the coagulation point of the essential oil and volatilization of the essential oil is small, regardless as to whether the treatment is conducted by the batch method or the column method, and regardless as to whether the treatment is conducted by any one of the above (α) to (δ). Above all, the treatment with active carbon is conducted at a temperature such that the temperature (liquid temperature) of the essential oil or the essential oil solution, comprising a contaminant is a range of from −30° C. to 5° C., preferably from −25° C. to 5° C., and particularly preferably from −25° C. to 2° C. By employing the temperature, the contaminant can be smoothly removed with higher removal rate.

The purified essential oil obtained by the process of the present invention does not have poor balance of flavor and decrease in flavor strength, maintains flavor and flavor strength that the essential oil originally has, has excellent flavor, does not contain contaminant or if contained, contains an extremely slight amount to an extent of not impairing humans and animals. Therefore, the purified essential oil has excellent safety.

The purified essential oil obtained by the process of the present invention may be used as a flavor material without any modification, or may be used in the form of a flavor composition by appropriately combining with the conventional other flavor materials. The kind and the blending ratio of the other flavor material in the combination are not particularly limited, and in response to the kind and the like of the purified essential oil obtained by the process of the present invention, other flavor materials adapting thereto can be appropriately selected and used.

Various foods, drinks, and oral care products can be prepared using the purified essential oil obtained by the process of the present invention and/or a flavor composition obtained by blending the purified essential oil with the other flavor materials. Examples of the food or drink include drinks such as fruit juice drink, sports drink, carbonated drink, milk beverage, teas drink, alcoholic drinks and health drink; frozen sweets such as ice creams, sherbets and ice candies; favorite foods such as Japanese and western confectioneries, chewing gums, chocolates, breads, coffee and tea; foods or drinks such as various snacks; and candies, although not limiting thereto. Examples of the oral care products include dentifrice, dental rinse, gingival massage cream, local endermic liniment, lozenge and chewing gum.

EXAMPLES

The present invention is described specifically below by Examples and the like, but it should be understood that the invention is not limited to the following Examples and the like.

In the following Examples and Comparative Examples, quantitative determination of residual agricultural chemicals (ortho-phenyl phenol) in the essential oil (various citrus oils) and quantitative determination of each ingredient contained in the essential oil (each flavor ingredient) were conducted by gas chromatograph/mass spectrometry-mass spectroscopy (GC/MS-MS) employing the following apparatus and conditions.

Apparatus and Condition Relating to GC/MS-MS
  GC model name: "Agilent Technologies HP6890N", manufactured by Agilent Technologies
  GC column name: "DB-5MS" (30 m×0.25 mm I.D., thickness: 0.25 μm), manufactured by Agilent Technologies
  MS model name: "Quatro micro GC", manufactured by Micromass
  GC Conditions
  Injection method: Splitless
  Injection amount: 2 μL
  Injection inlet temperature: 250° C.
  Column temperature: 50° C. for 1 minute→Heating to 125° C. at 15° C./min→Heating to 300° C. at 5° C./min, and then maintaining at 300° C. for 9 minutes
  Flow rate: 1.0 ml/min
  MS-MS Conditions
  Ion source temperature: 180° C.
  Ionization method: EI+ mode
  Ionization voltage: 70 eV In the following Examples and Comparative Examples, the removal rate of ortho-phenyl phenol from the essential oil (each citrus oil) was obtained by the following mathematical formula (1):

$$\text{Ortho-phenyl phenol removal rate (\%)} = \{(A_0 - A_1)/A_0\} \times 100 \qquad (1)$$

wherein $A_0$ is the content (ppm) of ortho-phenyl phenol in an essential oil (citrus oil) before purification treatment, and $A_1$ is the content (ppm) of ortho-phenyl phenol in an essential oil (citrus oil) after purification treatment.

Examples 1 to 3 and Comparative Examples 1 and 2

(1) Five kinds of adsorbents shown in Table 1 were added to 5 g of grapefruit cold press oil in which ortho-phenyl phenol remains (ortho-phenyl phenol concentration=49.1 ppm) respectively in an amount of 1% by mass, 2% by mass, 4% by mass or 8% by mass, based on the mass of the grapefruit cold press oil, followed by well suspending and then stirring at room temperature (25° C.) for 1 hour. The adsorbent was filtered to recover the grapefruit cold press oil.

(2) The content of ortho-phenyl phenol in the grapefruit cold press oil after the treatment with the adsorbent, recovered in (1) above was analyzed with GC/MS-MS by the method described above, and removal rate (%) of the ortho-phenyl phenol was obtained according to the mathematical formula (1) above. The results obtained are shown in Table 1.

TABLE 1

| | Removal Rate (%) of Ortho-Phenyl Phenol | | | | |
| --- | --- | --- | --- | --- | --- |
| | Example 1 | Example 2 | Example 3 | Comparative Example 1 | Comparative Example 2 |
| Kind of adsorbent | Seisei Shirasagi[1] (Active carbon) | Shirasagi A[2] (Active carbon) | Kuraray Coal GM[3] (Active carbon) | Silica gel 3A[4] (Silica gel) | POLYCLAR PLUS 730[5] (Polyvinyl pyrrolidone) |

TABLE 1-continued

| | Removal Rate (%) of Ortho-Phenyl Phenol | | | | |
|---|---|---|---|---|---|
| | Example 1 | Example 2 | Example 3 | Comparative Example 1 | Comparative Example 2 |
| Amount of adsorbent added | | | | | |
| 1% by mass | 14 | 11 | 14 | 13 | 11 |
| 2% by mass | 33 | 25 | 22 | 2 | 10 |
| 4% by mass | 47 | 33 | 37 | 0 | 14 |
| 8% by mass | 69 | 44 | 53 | 0 | 27 |

[1] Manufactured by Japan EnviroChemcials, Ltd. (Zinc chloride-activated powdery active carbon)
[2] Manufactured by Japan EnviroChemcials, Ltd. (Steam-activated powdery active carbon)
[3] Manufactured by Kuraray Chemical Co., Ltd. (Steam-activated powdery active carbon)
[4] Manufactured by Fuji Silysia Chemical Ltd. (Crushed silica gel)
[5] Manufactured by ISP Japan Ltd. (Polyvinyl pyrrolidone)

(3) As shown in Table 1, in Examples 1 to 3, by treating the grapefruit cold oil in which ortho-phenyl phenol (agricultural chemical) remained therein with active carbon, the removal rate of the ortho-phenyl phenol was greatly increased as compared with Comparative Examples 1 and 2 in which the grapefruit cold press oil was treated with other adsorbent comprising silica gel or polyvinyl pyrrolidone.

Above all, in Example 1, by using "Seisei Shirasagi" which is active carbon activated with zinc chloride, as the active carbon, the ortho-phenyl phenol was efficiently removed with higher removal rate.

Example 4

(1) Zinc chloride-activated powdery active carbon ("Seisei Shirasagi", manufactured by Japan EnviroChemicals, Ltd.) as an adsorbent was added to 5 g of grapefruit cold press oil in which ortho-phenyl phenol remained therein (ortho-phenyl phenol concentration=49.1 ppm) in an amount of 1% by mass, 2% by mass, 4% by mass or 8% by mass, based on the mass of the grapefruit cold press oil, followed by well suspending and stirring at the respective temperatures for 1 hour as shown in Table 2. Then, the adsorbent was filtered to recover the grapefruit cold press oil.

(2) The content of ortho-phenyl phenol in the grapefruit cold press oil after the treatment with the zinc chloride-activated powdery active carbon, recovered in (1) above was analyzed with GC/MS-MS by the method described above, and the removal rate (%) of the ortho-phenyl phenol was obtained according to the mathematical formula (1) above. The results obtained are shown in Table 2.

TABLE 2

| | Removal rate (%) of Ortho-Phenyl Phenol Treatment temperature (° C.) | | | | | | |
|---|---|---|---|---|---|---|---|
| Amount of active carbon[1] added | −50° C. | −25° C. | −5° C. | 2° C. | 25° C.[2] | 40° C. | 60° C. |
| 1% by mass | 20 | 23 | 23 | 18 | 14 | 9 | 8 |
| 2% by mass | —[3] | 40 | 37 | 37 | 33 | 23 | —[3] |
| 4% by mass | —[3] | 63 | 48 | 58 | 47 | 40 | —[3] |
| 8% by mass | —[3] | 86 | 77 | 80 | 69 | 61 | —[3] |

[1] Zinc chloride-activated powdery active carbon ("Seisei Shirasagi", manufactured by Japan EnviroChemicals Ltd.
[2] Room temperature
[3] Not conducted (3) As shown in Table 2, in removing the contaminant (residual agricultural chemicals and the like) contained in the essential oil (grapefruit cold press oil) by treating with active carbon, the contaminant (residual agricultural chemicals) can be effectively removed at a temperature in a range of from −25° C. to 40° C. Above all, it was found that when the treatment is conducted at a temperature of room temperature or lower, particularly from −25° C. to 5° C., the removal rate of ortho-phenyl phenol (agricultural chemical) is improved, and particularly, the removal rate in a temperature range of from −25° C. to 2° C. is high.

Test Example 1

(1) Ingredients of the grapefruit cold press oil in which ortho-phenyl phenol remained therein (oil before subjecting to the treatment with active carbon) used in Example 4 were analyzed (analysis of flavor ingredients) with GC/MS-MS by the method described above, and additionally, in Example 4 (1), components of:

(A) purified grapefruit cold press oil obtained by the treatment of adding zinc chloride-activated powdery active carbon (Seisei Shirasagi) in an amount of 8% by mass, followed by stirring at room temperature (25° C.) for 1 hour (hereinafter referred to as "purified grapefruit oil (A)"), and (B) purified grapefruit cold press oil obtained by the treatment of adding zinc chloride-activated powdery active carbon (Seisei Shirasagi) in an amount of 8% by mass, followed by stirring at a temperature of −25° C. for 1 hour (hereinafter referred to as "purified grapefruit oil (B)"), were analyzed (analysis of flavor ingredients) with GC/MS-MS by the method described above, and the residual ratio of each main flavor ingredient contained in the purified grapefruit oils (A) and (B) was obtained. The results obtained are shown in Table 3.

The residual ratio of each ingredient (each flavor ingredient or ortho-phenyl phenol) in Table 3 was obtained by the following mathematical formula (2).

$$\text{Residual ratio of each ingredient (\%)} = (C_1/C_0) \times 100 \quad (2)$$

wherein $C_0$ is the content (ppm) of each ingredient in the essential oil (grapefruit oil) before subjecting to purification treatment, and $C_1$ is the content (ppm) of each ingredient in the essential oil (purified grapefruit oil) after conducting purification treatment.

(2) (i) 30 g of the same grapefruit cold press oil in which ortho-phenyl phenol remained therein (oil before subjecting to purification treatment) as used in Example 4 was passed through a column (inner diameter of column: 15 mm, length of silica gel filled portion: 120 mm) filled with 15 g of silica gel (crushed silica gel "Silica Gel 3A", manufactured by Fuji Silysia Chemical Ltd.) at 25° C., thereby obtaining purified grapefruit oil having the residual ratio of ortho-phenyl phenol of 23% (removal rate of ortho-phenyl phenol: 77%) (hereinafter referred to as "purified grapefruit oil (C)") as shown in Table 3 below.

(ii) The purified grapefruit oil (C) obtained in (i) above was analyzed (analysis of flavor ingredients) with GC/MS-MS by the method described above, and the residual ratio of each main flavor ingredient contained in the purified grapefruit oil (C) was obtained by the mathematical formula (2) above. The results obtained are shown in Table 3.

TABLE 3

Residual Ratio of Flavor Component and Ortho-Phenyl Phenol

| | Kind of Citrus Oil | | | |
|---|---|---|---|---|
| | Non-purified grapefruit oil[1] | Purified grapefruit oil[2] | Purified grapefruit oil[3] | Purified grapefruit oil[4] |
| Flavor ingredient | | | | |
| Nootkatone | 100% | 100% | 82% | 7% |
| Octanal | 100% | 100% | 100% | 79% |
| Nonanal | 100% | 100% | 100% | 69% |
| Decanal | 100% | 100% | 100% | 77% |
| Dodecanal | 100% | 100% | 100% | 100% |
| Linalool | 100% | 100% | 93.5% | 100% |
| Agricultural chemical: Ortho-phenyl phenol | 100% | 31% (Removal rate: 69%) | 14% (Removal rate: 86%) | 23% (Removal rate: 77%) |

[1] Grapefruit cold press oil before subjecting to the treatment with active carbon
[2] Purified grapefruit cold press oil obtained by adding zinc chloride-activated active carbon powder in an amount of 8% by mass, and stirring at room temperature (25° C.) for 1 hour
[3] Purified grapefruit cold press oil obtained by adding zinc chloride-activated active carbon powder in an amount of 8% by mass, and stirring at −25° C. for 1 hour
[4] Purified grapefruit cold press oil obtained by passing through a silica gel column at 25° C.

(3) As shown in Table 3, in the purified citrus oils (purified grapefruit oil (A) and purified grapefruit oil (B)) obtained by treating citrus oil (grapefruit cold press oil) in which agricultural chemical (ortho-phenyl phenol) remained therein with active carbon, the agricultural chemical (ortho-phenyl phenol) is smoothly removed with high removal rate. Additionally, decrease in flavor ingredients contained in the citrus oil (purified grapefruit oils (A) and (B)) is extremely small (residual ratio of flavor ingredients is extremely high), and poor balance of flavor and decrease in flavor strength did not almost occur.

Contrary to this, in the purified citrus oil (purified grapefruit oil (C)) obtained by treating the citrus oil (grapefruit cold press oil) in which agricultural chemical (ortho-phenyl phenol) remained therein with silica gel, in the case of increasing the removal rate of the agricultural chemical (ortho-phenyl phenol) (in the case where the residual ratio of ortho-phenyl phenol was low as 23%), of the flavor ingredients contained in the citrus oil (purified grapefruit oil (C)), the residual ratio of nootkatone was extremely low, and almost all of nootkatone was lost. Additionally, octanal, nonanal and decanal were lost in considerable amounts, causing poor balance of flavor, and decrease of flavor strength.

(4) Ten skilled panelists conducted functional evaluation on flavor strength and odor quality of grapefruit cold press oil before subjecting to the treatment with active carbon, and flavor strength and odor quality of the purified grapefruit oil (B) obtained by adding active carbon (Seisei Shirasagi) in an amount of 8% by mass and adsorption-treating at −25° C. for 1 hour under stirring. As a result, nine panelists of ten panelists judged that there is no great difference between the grapefruit oil before subjecting to the treatment with active carbon and the purified grapefruit oil (B) treated with active carbon.

Furthermore, the same ten panelists conducted functional evaluation on flavor strength and odor quality of the purified grapefruit oil (C) obtained by purification-treating with silica gel. As a result, all the ten panelists judged that poor balance of flavor caused, flavor inherent in the grapefruit oil was lost, and flavor strength was greatly decreased.

Example 5

Preparation of Lemon Flavor Composition (1) 80 g of steam-activated powdery active carbon ("Shirasagi A", manufactured by Japan EnviroChemicals, Ltd.) was added to 1 kg of lemon cold press oil, and suspended therein, followed by stirring at −25° C. for 30 minutes. 20 g of diatomaceous earth filter aid ("Celite 545", manufactured by Showa Chemical Industry Co., Ltd.) was then added, and the solid contents were removed by pressure filtration, thereby obtaining 900 g of purified lemon cold press oil.

(2) 100 g of a 60% ethanol aqueous solution was mixed with 100 g of the purified lemon oil obtained in (1) above, followed by liquid separation, and an ethanol layer was recovered. The ethanol layer recovered was used as a lemon flavor composition.

Example 6

Recovery of Limonene and Preparation of Orange Flavor Composition (1) 50 g of steam-activated powdery active carbon ("Shirasagi A", manufactured by Japan EnviroChemicals, Ltd.) was added to 1 kg of orange cold press oil, and suspended therein, followed by stirring at 5° C. for 1 hour. 30 g of diatomaceous earth filter aid ("Celite 545", manufactured by Showa Chemical Industry Co., Ltd.) was then added, and the solid contents were removed by pressure filtration, thereby obtaining 900 g of purified orange oil.

(2) 100 g of the purified orange oil obtained in (1) above was distilled under reduced pressure, thereby recovering 50 g of limonene.

(3) Distillation reside after recovering the limonene in (2) above was extracted with 80 g of a 60% ethanol aqueous solution, followed by liquid separation, and an ethanol layer was recovered. The ethanol layer recovered was used as an orange flavor composition.

Example 7

Preparation of Grapefruit Flavor Composition (1) 300 g of ethanol and 40 g of zinc chloride-activated powdery active carbon ("Seisei Shirasagi", manufactured by Japan EnviroChemicals, Ltd.) were added to 500 g of grapefruit oil, and the resulting mixture was stirred at 10° C. for 1 hour. 40 g of diatomaceous earth filter aid ("Celite 545", manufactured by Showa Chemical Industry Co., Ltd.) was then added, and the solid contents were removed by pressure filtration, thereby obtaining purified grapefruit oil.

(2) 200 g of ion-exchanged water was added to the purified grapefruit oil obtained in (1) above, and then allowed to stand. Ethanol layer was recovered, and the ethanol layer recovered was used as a grapefruit flavor composition.

Example 8

Preparation of Fruit Juice Drink

Using the orange flavor composition prepared in Example 6, fruit juice drink was prepared by using the ingredients shown in Table 4 below in amounts of the formulation shown in Table 4, uniformly mixing at 25° C., and then cooling to 5° C. The drink obtained had good orange flavor.

TABLE 4

| Formulation (g) of Fruit Juice Drink | |
| --- | --- |
| High-fructose glucose syrup | 107.0 |
| Citric acid | 1.0 |
| Sodium citrate | 0.3 |
| Orange-concentrated juice | 51.8 |
| Water-soluble orange flavor | 1.0 |
| Orange flavor composition prepared in Example 6 | 0.15 |
| Water | Remainder |
| Total | 1000.0 |

Example 9

Preparation of Sports Drink

Using the lemon flavor composition prepared in Example 5, sports drink was prepared by using the ingredients shown in Table 5 below in amounts of the formulation shown in Table 5, uniformly mixing at 25° C., and then cooling to 5° C. The drink thus obtained had lemon flavored fresh aroma.

TABLE 5

| Formulation (g) of Sports Drink | |
| --- | --- |
| Sugar | 31.0 |
| Glucose | 15.7 |
| Citric acid | 1.0 |
| Calcium Lactate | 0.679 |
| Sodium citrate | 0.3 |
| Sodium chloride | 0.28 |
| Potassium chloride | 0.22 |
| Vitamin C | 0.864 |
| Sodium L-glutamate | 0.03 |
| Niacin | 0.013 |
| Calcium pantothenate | 0.007 |
| Vitamin B6 | 0.022 |
| Vitamin B12 | 0.00006 |
| Lemon flavor | 1.0 |
| Lemon Flavor composition prepared in Example 5 | 0.1 |
| Purified water | Remainder |
| Total | 1000.0 |

Example 10

Preparation of Carbonated Drink

Using the lemon flavor composition prepared in Example 5, carbonated drink was prepared by using the ingredients shown in Table 6 below in amounts of the formulation shown in Table 6, uniformly mixing at 15° C. under pressure, and then cooling to 5° C. The carbonated drink thus obtained had good taste and aroma since carboxylic acid was matched up with lemon flavor.

TABLE 6

| Formulation (g) of Carbonated Drink | |
| --- | --- |
| High-fructose glucose syrup | 127.0 |
| Citric acid | 1.24 |
| Purified water | 200.0 |
| Lemon flavor | 1.0 |
| Lemon flavor composition prepared in Example 5 | 0.1 |
| Carbonated water | Remainder |
| Total | 1000.0 |

Example 11

Preparation of Health Drink

Using the grapefruit flavor composition prepared in Example 7, health drink was prepared by using the ingredients shown in Table 7 below in amounts of the formulation shown in Table 7, uniformly mixing at 25° C., and then cooling to 5° C. The health drink thus obtained had good grapefruit flavor.

TABLE 7

| Formulation (g) of Health Drink | |
| --- | --- |
| White sugar | 20.0 |
| Sorbit | 3.0 |
| Citric acid | 0.25 |
| DL-malic acid | 0.05 |
| Aminoethylsulfonic acid | 0.50 |
| Glucuronolactone | 0.50 |
| Thiamine chloride | 0.002 |
| Riboflavin | 0.005 |
| Pyridoxine chloride | 0.005 |
| Caffeine | 0.05 |
| Nicotinic-acid amide | 0.02 |
| Purified honey | 2.0 |
| Grapefruit flavor | 1.0 |
| Grapefruit flavor composition prepared in Example 7 | 0.1 |
| Purified water | Remainder |
| Total | 1000.0 |

Example 12

Preparation of Dentifrice

Using the lemon flavor composition prepared in Example 5, dentifrice was prepared by using the ingredients shown in Table 8 below in amounts of the formulation shown in Table 8, uniformly mixing at 25° C., and then cooling to room temperature. The dentifrice thus obtained had lemon flavor.

TABLE 8

| Formulation (g) of Dentifrice | |
| --- | --- |
| Dicalcium phosphate | 10.0 |
| Sodium lauryl sulfate | 2.0 |
| Sodium carboxymethyl cellulose | 0.5 |
| Saccharine sodium | 0.02 |
| Mint flavoring agent | 1.0 |

TABLE 8-continued

| Formulation (g) of Dentifrice | |
| --- | --- |
| Citrus mint flavor | 5.0 |
| Flavor composition described in Example 4 | 0.5 |
| Glycerin | Remainder |
| Total | 100 |

Example 13

Preparation of Dental Rinse

Using the orange flavor composition prepared in Example 6, dental rinse was prepared by using the ingredients shown in Table 9 below in amounts of the formulation shown in Table 9, uniformly mixing at 25° C., and then cooling to 5° C. The dental rinse thus obtained had orange flavor.

TABLE 9

| Formulation (part by mass) of Dental Rinse | |
| --- | --- |
| Ethyl alcohol | 10.0 |
| Polyoxyethylene hydrogenated castor oil | 2.0 |
| Mint flavoring agent | 0.5 |
| Saccharine sodium | 0.02 |
| Citrus flavor | 0.25 |
| Orange flavor composition prepared in Example 6 | 0.1 |
| Glycerin | 10.0 |
| Purified water | Remainder |
| Total | 100.0 |

Example 14

Production of Candy

Using the grapefruit flavor composition prepared in Example 7, candy was manufactured by using the ingredients shown in Table 10 below in amounts of the formulation shown in Table 10, melt kneading at 100° C., extruding into a rod shape having a diameter of about 1.5 cm, solidifying by cooling, and then cutting to a given length (about 2 cm). The candy thus obtained had grapefruit flavor, had good aroma and good taste.

TABLE 10

| Formulation (part by mass) of Candy | |
| --- | --- |
| Sugar powder | 50 |
| Starch syrup | 33 |
| Citric acid | 1 |
| Grapefruit flavor | 0.25 |
| Grapefruit flavor composition prepared in Example 7 | 0.01 |
| Purified water | Remainder |
| Total | 100 |

Example 15

Preparation of Flavor Emulsion (Cloudy)

(1) 5.0 g of sucrose acetate isobutylate ("SAIB", manufactured by Eastman Kodak Company), 1.67 g of the orange flavor composition prepared in Example 6, 3.33 g of middle-chain triglyceride (MCT OIL) ("PANACET 810", manufactured by Ougi Chemical Co., Ltd.) and 0.2 g of an elemi resin were placed in a 200 ml beaker, and dissolved by heating, thereby obtaining a mixture comprising the orange flavor composition.

(2) 250 g gum arabic and 648 g of water were placed in a 1 liter beaker, and dissolved by heating, followed by sterilization. Thus, a gum arabic aqueous solution was prepared.

(3) The mixture prepared in (1) above was added to the gum arabic aqueous solution prepared in (2) above, followed by stirring at 5,000 to 12,000 rpm for 30 minutes. The resulting mixture was further treated with a high pressure homogenizer under the condition of 100 to 300 kg/cm$^2$, thereby preparing a flavor emulsion (cloudy).

Example 16

Preparation of Fruit Juice Drink Using Flavor Emulsion (Cloudy)

Using the flavor emulsion (cloudy) prepared in Example 15, fruit juice drink was prepared by using the ingredients shown in Table 11 below in amounts of the formulation shown in Table 11, uniformly mixing at 25° C., and then cooling to 5° C. The drink thus obtained had orange flavor, and maintained high appearance of preference property.

TABLE 11

| Formulation (g) of Fruit Juice Drink Using Flavor Emulsion (Cloudy) | |
| --- | --- |
| High-fructose glucose syrup | 107.0 |
| Citric acid | 1.0 |
| Sodium citrate | 0.3 |
| Orange concentrated juice | 51.8 |
| Water-soluble orange flavor | 1.0 |
| Flavor emulsion (cloudy) prepared in Example 15 | 0.52 |
| Water | Remainder |
| Total | 1000.0 |

Example 17

Preparation of Citrus Flavor Composition

Citrus flavor composition was prepared by using the ingredients shown in Table 12 in the formulation shown in Table 12, and uniformly mixing at 25° C.

TABLE 12

| Formulation (g) of Citrus Flavor Composition | |
| --- | --- |
| Decanol | 0.25 |
| Dodecanol | 0.25 |
| Decanal | 1.40 |
| Dodecanal | 0.75 |
| Citral | 1.85 |
| Geranyl acetate | 2.00 |
| Terpenyl acetate | 2.00 |
| Linalyl acetate | 2.50 |
| Citronellol | 2.00 |
| Orange flavor composition prepared in Example 6 | 1000.00 |

INDUSTRIAL APPLICABILITY

Agricultural chemicals and other contaminants, contained in an essential oil can be removed simply with high removal rate by the present invention, without causing poor balance of flavor and decrease in flavor strength, of the essential oil. Therefore, the present invention is extremely useful as a process for producing a purified essential oil having excellent safety and high quality.

Although the present invention has been described in detail and by reference to the specific embodiments, it is apparent to one skilled in the art that various modifications or changes can be made without departing the spirit and scope of the present invention. The present application is based on Japanese Patent Application No. 2008-288699 filed Nov. 11, 2008, the disclosure of which is incorporated herein by reference in its entity.

The invention claimed is:

1. A process for producing a purified citrus oil, comprising
   a) contacting a citrus oil comprising a contaminant with an active carbon to prepare a suspension;
   b) stirring the suspension at a temperature of from −30° C. to 5° C. for 10 minutes to 2 hours; and
   c) recovering the purified citrus oil from which the contaminant is removed,
   wherein the active carbon is an activated active carbon activated with zinc chloride,
   wherein the contaminant is a residual agricultural chemical which is one kind or a mixture of two or more kinds selected from ortho-phenyl phenol, chloroneb, simazine, carbaryl, chlorpyrifos, imazalil, thiabendazole and diphenyl,
   wherein the active carbon is added in an amount of 0.5 to 10% by mass, based on the mass of the citrus oil comprising a contaminant, and
   wherein flavor and odor components of the citrus oil, selected from the group consisting of nootkatone, octanal, nonanal, decanal, dodecanal and linalool, remain unchanged in the obtained purified citrus oil.

2. The process for producing a purified citrus oil according to claim 1, wherein the citrus oil is one kind or a mixture of two or more kinds selected from lemon oil, sweet orange oil, bitter orange oil, lime oil, grapefruit oil, bergamot oil, mandarin oil, Yuzu oil (Citrus junos oil) and Sudachi oil (Citrus sudachi oil).

* * * * *